(12) United States Patent
Rao et al.

(10) Patent No.: US 6,515,770 B1
(45) Date of Patent: Feb. 4, 2003

(54) DITHER MASK GENERATION WITH CALIBRATION-INDEPENDENT NUMBER OF THRESHOLD LEVELS

(75) Inventors: Ravishankar Rao, White Plains, NY (US); Gerhard R. Thompson, Wappingers Falls, NY (US); Charles P. Tresser, Mamaroneck, NY (US); Chai W. Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/270,042

(22) Filed: Mar. 16, 1999

(51) Int. Cl.$^7$ .............................. G06K 15/00; G06K 9/38
(52) U.S. Cl. ...................... 358/3.13; 358/3.22; 382/270
(58) Field of Search .......................... 358/1.5, 1.8, 1.9, 358/517, 3.13, 3.22; 382/270

(56) References Cited

U.S. PATENT DOCUMENTS

| | | | | |
|---|---|---|---|---|
| 5,943,477 A | * | 8/1999 | Rao et al. | 358/1.8 |
| 6,055,065 A | * | 4/2000 | Rao et al. | 358/1.9 |
| 6,172,769 B1 | * | 1/2001 | Rao et al. | 358/1.9 |

\* cited by examiner

*Primary Examiner*—Edward Coles
*Assistant Examiner*—Monica Mitchell
(74) *Attorney, Agent, or Firm*—Whitham, Curtis & Christofferson, P.C.; Stephen C. Kaufman

(57) ABSTRACT

Calibrated dither masks adaptable to most printers are constructed in such a way that the threshold values can be adapted to a printer so that said printer can print the originally intended number of distinct tone levels. This adaptation can be done computationally so that the time it takes is not prohibitive. Furthermore, the resulting calibrated dither mask is such that there is no need for a tone reproduction curve in the halftoning process.

23 Claims, 2 Drawing Sheets

DITHER MASK GENERATION WITH CALIBRATION-INDEPENDENT NUMBER OF THRESHOLD LEVELS

BACKGROUND OF THE INVENTION

1. Field of the Invention

The present invention generally relates to digital halftoning techniques for printing a picture on a two-dimensional medium in printers. This invention is a method and apparatus to construct calibrated dither masks adaptable to most printers in such a way that the threshold values can be adapted to the printer so that the printer can print the originally intended number of distinct tone (e.g., grey or color) levels. This adaptation can be done computationally so that the time it takes is not prohibitive. The present invention builds on and improves upon previous techniques because the resulting calibrated dither mask is such that there is no need for a tone reproduction curve in the halftoning process.

2. Background Description

Most printers can print in only a limited number of colors. Digital halftoning is a technique for printing a picture (or more generally displaying it on some two-dimensional medium) using small dots with a limited number of colors such that it appears to consist of many colors when viewed from a proper distance. For example, a picture of black and white dots can appear to display grey levels when viewed from some distance. In fact, the rest of the discussion will be specialized to the case of grey scale images and their rendering by black and white printers to facilitate the presentation.

We will be concerned with bilevel, fixed pixel size printers (for instance laser printers). Such printers are usually considered to have two fundamental characteristics: the pixel density, say d dpi (dots per inch), which can be interpreted as telling us that the ideal pixel size is 1/d inches by 1/d inches (where d typically varies from about 300 to about 3000) and the mechanical dot gain which is a number describing how much bigger the printed dot is compared to a perfect 1/d by 1/d square.

Consider now some grey scale image to be printed with a digital printer. We assume that this image is of size h by v, where h and v are expressed in inches to be consistent with the unit used in the dot resolution description. It is then convenient to interpret this image as a matrix I of size H=h×d by V=v×d in the following way:

One thinks of the image as covered by little squares of size 1/d by 1/d called pixels.

Then each pixel p, can be designated by its horizontal ordering number i (say from left to right) and its vertical ordering number j (say from top to bottom); thus, the location of p is specified by the pair (i,j).

To the pixel (i,j) one assigns the value val between 0 and 1, where 0 corresponds to white, 1 corresponds to black, and more generally, val corresponds to the grey level of this particular pixel.

Given a matrix such as I, a digital halftoning algorithm will associate to it a H by V printing decision matrix M whose entries M(i,j) are either 0 or 1, where 0 now means that no dot will be printed by the digital printer at pixel (i,j), while a 1 means that a dot is to be printed.

One of most frequently used methods of preparing such a matrix M, consists in using some dither mask D. Such a mask, defined either in hardware or in software, can be thought of as a matrix of numbers. We assume that D is a W by L matrix with entries between 0 and 1. One uses D to generate M by setting $M(i,j)=1$ if $I(i,j)>D(i \bmod W, j \bmod L)$, $M(i,j)=0$ if $I(i,j)<D(i \bmod W, j \bmod L)$.

In these formulas, the mod notation should be understood as follows: If a and b are two integers, a mod b is the remainder of the division of a by b. The formulas for M justify the name of threshold levels for the entries of D. We denote by T the set of threshold values of D. The number of distinct threshold values determines the number of distinct grey levels which could be printed with D on a printer with perfect 1/d by 1/d pixels. In fact, if the image I is some uniform grey level $g_1$, only those pixels with $D(i \bmod W, j \bmod L)<g$ get printed. As a consequence, except in the case when D is designed for a specific printer, since the dot gain is unknown, one chooses the threshold values to be evenly distributed between 0 and 1. The book "*Digital Halftoning*" by R. Ulichney (MIT Press Cambridge, Mass. 1987), which is a general reference on digital halftoning contains several methods of generating dither masks. In the patent application "*Clustered Aperiodic Mask*" by G. R. Thompson et al., Ser. No. 08/943,881, filed Oct. 3, 1997, a method is disclosed to generate a dither mask which can have a large number of grey levels.

To calibrate the printer for printer characteristics such as dot gain, prior art uses a tone reproduction curve (TRC), a function which describes the relationship between the intended grey and the actual grey printed by the printer. This is usually implemented as a look-up table. For instance, in U.S. Pat. No. 5,309,177 issued to Shoji et al., a TRC is used as a look-up table to correct the image data to be printed. In U.S. Pat. No. 5,347,369 issued to Harrington, a method is disclosed to obtain the TRC without special equipment.

Problems to Be Solved

If the dither mask D is used on a printer P, because of the way P prints dots, the printed version of each individual grey level will be different from what is intended. In prior art, one usually corrects this problem by using a (printer dependent) tone reproduction curve T which describes the relationship between the grey that you instruct the printer to print and the grey the printer actually prints. For example, instructing the printer to print a uniform patch of grey level g could result in a patch with grey level g'. The relation between various values of g and corresponding values g' is embodied in a tone reproduction curve, T(g), which specifies the output grey level for a given input grey level. In other words, T(g)=g'. The tone reproduction curve is then used either to transform the grey level at each (i,j) before it is compared to the threshold value D(i,j), or to transform the entries of D. This can result in the number of distinct grey levels which can be printed being less than the number of distinct values in the original matrix D. Specifically, this happens when D consists entirely of a sequence of k consecutive integers from 1 through k, and T is a non-linear mapping onto 1 through k. Then some input integers are mapped onto the same output integer and the number of distinct output integers is less than the number of input integers, k.

SUMMARY OF THE INVENTION

It is therefore an object of the invention to provide a method and apparatus to construct calibrated dither masks adaptable to most printers in such a way that the threshold values can be adapted to printer P so that printer P can print the originally intended number of distinct tone levels. This adaptation can be done computationally so that the time it takes is not prohibitive. Furthermore, the resulting calibrated dither mask is such that there is no need for a tone reproduction curve in the halftoning process.

Several methods are available which allows one to compute an approximation $N_1(M, P)$ of the image a printer P will print given the matrix M. If a dither mask is to be prepared to print d distinct grey levels with essentially any printer P, we will prepare a master mask $D_0$ with some number $d_0$ of threshold levels, where $d_0$ is significantly larger than d. For each of these threshold levels, t, one can easily compute the matrix M(t) corresponding to a constant grey level t. In other words, we print a patch of constant input grey level t of the size of M using the dither matrix $D_0$. As mentioned above, one deduces easily from there the matrix $N_1(M(t), P)$ if the specificity of P is known in a convenient way. We then select the d−1 values of t which give the closest approximations to the grey levels 1/d, 2/d, . . . , (d−1)/d, and call $t_1, t_2, \ldots, t_{d-1}$ the corresponding values of t in increasing order.

In other words, we print patches for all $d_0$ distinct grey values in $D_0$ and measure the output. White will be considered "0" and pure black is considered "1", with $d_0-1$ values in between. We then find which of those $d_o-1$ values is closest to 1/d, 2/d, . . . , (d−1)/d. We then select these to be the threshold values $t_i$.

The matrix $D_0$ is then transformed to a matrix $D_P$ adapted to the printer P by setting $$D_P(i, j) = \min_k (t_k | t_k \geq D_0(i, j)).$$

Note that $D_P$ contains fewer values than $D_0$, and intermediate values in $D_0$ are set to the next highest values of $t_k$ in the sequence $t_1, t_2, \ldots, t_{d-1}$. Some of the main features of the present invention are:

1. The resulting, calibrated halftoning system allows a predetermined number of grey levels to be printed.
2. The resulting calibrated halftoning system utilizes a simple dither algorithm without the need for a tone reproduction curve.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
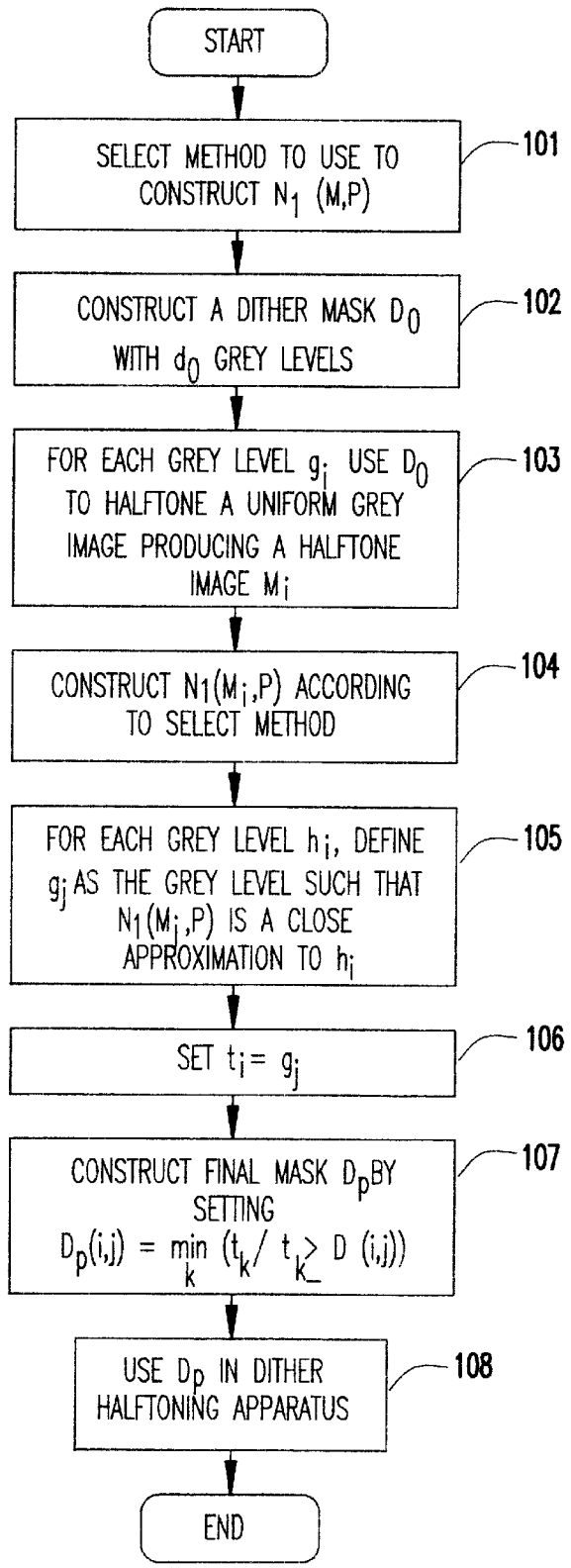
FIG. 1 is a flow diagram describing the preferred embodiment of the invention.

While standard theory assumes that printers print dots reasonably described as round, say with diameter D, many printers perform differently. As taught in the U.S. patent application Ser. No. 09/085,094, filed May 26, 1998, by A. R. Rao et al. and entitled "*Microlocal Calibration of Digital Printers*", both the probabilistic nature of individual dot printing and the way printing neighboring dots in various configurations affect the dot shapes can be captured by a calibration method. This method characterizes a printer by the probability distribution of what area of ink gets printed at each pixel depending on the configuration of dots to be printed in the neighborhood of that pixel (here we use the word "ink" as a generic name for what gets printed, such as ink or toner). In the sequel, whenever we speak of printer characteristic, we mean the characteristic as given by the method described in application Ser. No. 09/085,094, except otherwise specified.

The probabilistic nature of such printer characterization means in particular that the notation "fixed pixel size" for a printer refers to its idealized properties rather than to actual ones.

As taught in application Ser. No. 09/085,094, the amount of ink being printed at location (i,j) is described by probability distributions depending on the local configuration of dots scheduled to be printed by the matrix M in some neighborhood $U_1$ of (i,j). This general description contains in particular the simplest case where dots are modeled by round dots with constant diameter. Thus, the printer characteristic, together with the matrix M, allows one to approximate the matrix $N_1$ as we shall next explain. Let $J(M,P)_{(i,j)}$ be the H by V matrix which is zero at each entry except at (i,j) where it is equal to the proportion of the pixel (i,j) to be covered by ink according to M and the printer characteristics Then $N_1$ can be approximated by the sum of all the matrices $J(M,P)_{(i,j)}$.

If one uses instead the more common model of a deterministic round dot with diameter D, one can proceed as above after using such simple geometric data to reconstruct printer characteristics. Then the probabilistic aspect has disappeared, but the local configuration dependence remains. As an intermediate step between a complete printer characterization and a single diameter round dot model, one can also use a variable diameter round dot model. In this case the diameter either depends on the local configuration, which brings us to a formulation almost equivalent to the splat characterization (a probabilistic component can indeed be incorporated), or depends more simply on the local density, in which case one can vary the dependence by adjusting a curve (the graph diameter versus density).

Then a probabilistic aspect can be introduced (dots might not print at low density), in the form of a second graph.

Another method of computing $N_1(M, P)$ is simply to print the image M on the printer with printer characteristic P and measure the grey level at each pixel using a microdensitometer or scanner. In general, this invention can be adapted to any defined printer characterization of a printer.

Referring now to the drawings, and more particularly to FIG. 1, there is shown a flow diagram describing the preferred embodiment of the invention. Let d be the number of grey levels in the final dither mask. First, the method to compute $N_1(M, P)$ is determined in step 101 (see above for several examples of such a method). Next, in step 102, a dither mask $D_0$ is prepared with a large number of grey levels do according to prior art. We choose $d_0$ to be several times larger than d. For each of the $d_0$ grey levels $g_i$, the dither mask $D_0$ is used to produce a halftoned image (represented as a 0–1 matrix $M_i$) of a image of uniform grey $g_i$ using a standard dither halftoning algorithm in step 103. Using the method as described above, the matrix $N_1(M_i,P)$ is constructed which describes how the matrix $M_i$ will look like when printed in step 104.

For each of the d−1 grey levels $h_i$ where $h_i=i/d$, $i=1, \ldots, d-1$, we pick in step 105 the grey level $g_j$ such that $N_1(M_j,P)$ is a close approximation to the grey level $h_i$. Clearly, $g_j$ depends on $h_i$. We set $t_i$ equal to $g_j$ in step 106.

Thus, we obtain a set of grey levels $t_1, \ldots, t_{d-1}$. Next, the final mask $D_p$ is constructed in step 107 by setting $$D_p(i, j) = \min_k(t_k | t_k \geq D_0(i, j)).$$

Figure 2:
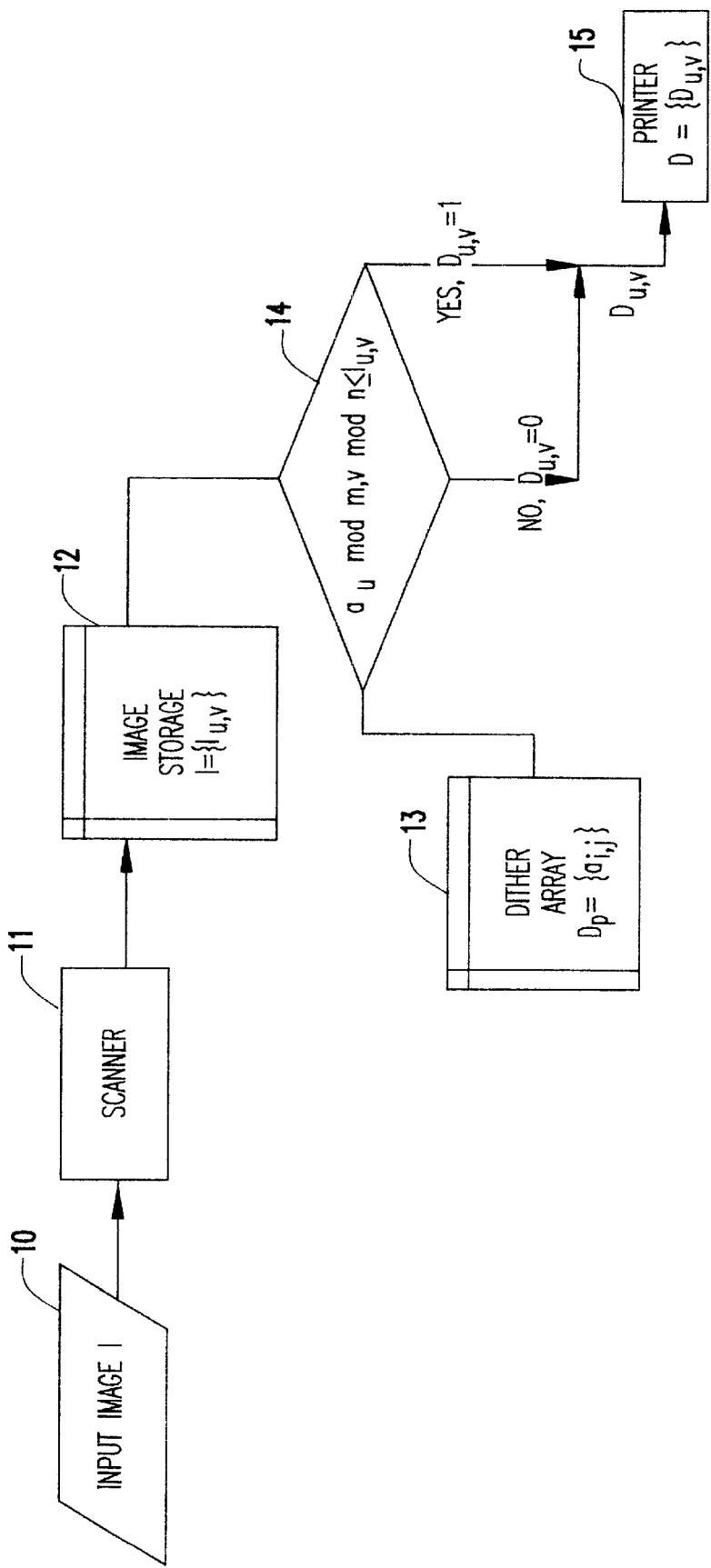
FIG. 2 is a block diagram of a halftoning system on which the invention may be implemented.

The dither mask $D_p$ is then used in a dither halftoning apparatus in step 108 as described in FIG. 2.

Referring now to FIG. 2, the input image 10 is scanned by a scanner 11 and stored in image storage 12 as image $I_{u,v}$ where (u,v) is the pixel location. The dither matrix array 13, $D_p$, is used to halftone the image in storage 12. More precisely, using a m by n dither matrix $D_p = \{a_{ij}\}$ in dither matrix array 13, the pixel at location (u,v) in image storage block 12 will get printed as a black dot if and only if the grey level on the image to be printed at location (u,v) is greater than or equal to $a_{u', v's}$, where u'=u mod m, v'=v mod n. This is determined in decision block 14, the output of which is sent to the printer 15. As usual in number theory, c mod d stands for the remainder of the division of c by d.

Using the mask $D_p$ would result in calibrated halftones with the number of grey levels being close to d. Note that a tone reproduction curve is not necessary in the printing apparatus of FIG. 2.

Once a mask is devised for halftoning grey scale pictures, prior art allows one to use it for color images. The individual color planes are halftoned using rotated periodic masks, in order to avoid moiré patterns, or other changes are made to aperiodic masks such as described for instance in U.S. Pat. No. 5,341,228 to K. J. Parker and T. Mitsa in the case of a blue noise mask. Adaptation of masks to multi-bit printers is also standard. Those versed in the art of printing will readily understand how to adapt the discussion and the invention to color images and color printing, as well as display on other multi-bit devices. Notice that, because of the way the human eye perceives color, the pixel-by-pixel solution which constitutes the present invention is not necessarily preferable to spectral approaches when it comes to polychrome images, but might be preferable in some instances.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for preparing a dither mask calibrated to a printer P such that the printer can print an intended number d of distinct halftone levels without using a tone reproduction curve to produce calibrated halftones by the printer, the method comprising the steps of:

preparing a master mask as a dither matrix $D_0$ with some number of $d_0$ of threshold levels, where $d_0$ is significantly larger than d;

constructing an approximation $N_1(M,P)$ of the image of the matrix printed by the printer P;

determining which of the $d_0-1$ values is closest to 1/d, 2/d, ..., (d-1)/d and then selecting those values to be threshold values $t_i$; and transforming the matrix $D_0$ to a calibrated dither mask $D_p$ adapted to printer P by setting $$D_p(i, j) = \min_k(t_k | t_k \geq D_0(i, j)).$$

2. A method for preparing a dither mask calibrated to a printer P as recited in claim 1, wherein the step of constructing an approximation $N_1(M,P)$ is performed using a model of the printer and parameters are adjusted for a best fit of the model.

3. A method for preparing a dither mask calibrated to a printer P as recited in claim 1, wherein the step of constructing an approximation $N_1(M,P)$ includes printing a patch of matrix size M of constant tone for a plurality of input tone levels t using the dither matrix $D_0$ measuring the outputs.

4. A method for preparing a dither mask calibrated to a printer P as recited in claim 3, wherein said dither mask $D_p$ is directly used by the printer to print calibrated halftones using digital halftoning techniques.

5. A method for preparing a dither mask calibrated to a printer P as recited in claim 3, wherein the step of constructing an approximation $N_1(M,P)$ is performed using experimentally measured characteristics of the printer and parameters are adjusted for a best fit of the measured characteristics.

6. A method for preparing a dither mask calibrated to a printer P as recited in claim 3, wherein the step of constructing an approximation $N_1(M,P)$ is performed using a model of the printer and parameters are adjusted for a best fit of the model.

7. A method for the halftoning of images to be used in a printer P such that the printer can print an intended number d of distinct grey levels without using a tone reproduction curve to produce calibrated halftones by the printer, comprising the steps of:

(a) providing a calibrated dither mask $D_p$ prepared by the steps of:
(i) preparing a master mask as a dither matrix $D_0$ with some number of $d_0$ of threshold levels, where $d_0$ is significantly larger than d;
(ii) constructing an approximation $N_1(M,P)$ of the image of the matrix printed by the printer P;
(iii) determining which of the values $d_0-1$ values is closest to 1/d, 2/d, ..., (d-1)/d and then selecting those values to be threshold values $t_i$; and
(iv) transforming the matrix $D_0$ to the calibrated dither mask $D_p$ adapted to printer P by setting $$D_p(i, j) = \min_k(t_k | t_k \geq D_0(i, j));$$

(b) directly comparing pixel-by-pixel an image to be printed against said calibrated dither mask $D_p$; and
(c) printing either a dot or no dot depending on an outcome of the comparing step.

8. A method for the halftoning of images as recited in claim 7, wherein the step (a)(ii) of constructing an approximation $N_1(M,P)$ is performed using a model of the printer and adjusts parameters for the best fit of the model.

9. A method for the halftoning of images as recited in claim 7, wherein the step (a)(ii) of constructing an approximation $N_1(M,P)$ includes printing a patch of matrix size M of constant tone for a plurality of input tone levels t using the dither matrix $D_0$ and measuring the outputs.

10. A method for the halftoning of images as recited in claim 9, wherein the step (a)(ii) of constructing an approximation $N_1(M,P)$ is performed using experimentally measured characteristics of the printer and adjusts parameters for a best fit of the measured characteristics.

11. A method for the halftoning of images as recited in claim 9, wherein the step (a)(ii) of constructing an approximation $N_1(M,P)$ is performed using a model of the printer and adjusts parameters for the best fit of the model.

12. The method of halftoning of images recited in claim 9, wherein said calibrated dither mask $D_p$ is used to halftone a grey scale image.

13. The method of halftoning of images recited in claim 9, wherein said calibrated dither mask $D_p$ is used to halftone a color image.

14. The method of halftoning of images recited in claim 9, wherein said calibrated dither mask $D_p$ is used to halftone images for displaying on a multi-bit device.

15. A method for preparing a dither mask calibrated to a printer P such that the printer can print an intended number d of distinct grey levels without using a tone reproduction curve to produce calibrated halftones by the printer, the method comprising the steps of:
  (a) selecting a method for constructing $N_1(M, P)$ which is an approximation of the image a printer P will print given the matrix M;
  (b) constructing a dither mask $D_0$ with do grey levels;
  (c) for each grey level $g_i$,
    (i) halftoning a uniform grey image producing a halftone image $M_i$ using $D_0$, and
    (ii) constructing $N_1(M_i, P)$ according to said selected method;
  (d) for each grey level $h_i$,
    (i) determining which of the values $d_0 1$ values is closest to 1/d, 2/d, . . . , (d−1)/d, and
    (ii) then selecting those values to be threshold values $t_i$; and
  (e) constructing calibrated dither mask $D_p$ such that $$D_p(i, j) = \min_k (t_k | t_k \geq D_0(i, j)).$$

16. A method for preparing a dither mask calibrated to a printer P as recited in claim 15, wherein the step of constructing $N_1(M, P)$ uses measured outputs from printing a patch of matrix size M of constant grey for a plurality of input grey levels t using the initial dither matrix $D_0$.

17. A method for preparing a dither mask calibrated to a printer P as recited in claim 15, wherein said calibrated dither mask $D_p$ is directly used by the printer to print calibrated halftones using digital halftoning techniques.

18. A printer control for the digital halftoning of images comprising:
  a calibrated dither mask calibrated to printer characteristics of printer P such that the printer can directly print an intended number of distinct tone levels from information stored in the calibrated dither mask, the calibrated dither mask being constructed by preparing an initial mask which can render many distinct tone levels and a number of distinct tone levels being reduced to an intended number of distinct tone levels by using said printer characteristics, such that said mask, when used with the printer P, is designed to produce visually pleasing dot configurations when thresholded at any level of tone thereby eliminating need for a tone reproduction curve;
  a comparator comparing pixel-by-pixel an input image against the calibrated dither mask; and
  an output circuit generating a printer command to print either a dot or no dot depending on an output from the comparator.

19. The printer control recited in claim 18, wherein said calibrated dither mask is used to halftone a grey scale image.

20. The printer control recited in claim 18, wherein said calibrated dither mask is used to halftone a color image.

21. The printer control recited in claim 18, wherein said calibrated dither mask is used to halftone images for displaying on a multi-bit device.

22. The printer control as recited in claim 18, wherein said calibrated dither mask is calibrated to the printer characteristics experimentally by measuring characteristics of the printer and adjusting parameters for a best fit of the measured characteristics.

23. The printer control as recited in claim 18, wherein said calibrated dither mask is calibrated to the printer characteristics using a model of the printer and adjusting parameters for the best fit of the model.

* * * * *